(12) United States Patent
Wu et al.

(10) Patent No.: US 8,023,075 B2
(45) Date of Patent: Sep. 20, 2011

(54) LIQUID CRYSTAL DISPLAY AND METHOD FOR FORMING ALIGNMENT FILM

(75) Inventors: Der-Chun Wu, Taipei County (TW); De-Jiun Li, Taipei County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 435 days.

(21) Appl. No.: 12/408,725

(22) Filed: Mar. 23, 2009

(65) Prior Publication Data
US 2010/0134730 A1    Jun. 3, 2010

(30) Foreign Application Priority Data
Dec. 2, 2008    (TW) .............................. 97146761 A

(51) Int. Cl.
*G02F 1/1333*    (2006.01)
*G02F 1/1335*    (2006.01)

(52) U.S. Cl. ........................................ 349/110; 349/114
(58) Field of Classification Search ................. 349/110, 349/73, 109, 114, 96
See application file for complete search history.

(56) References Cited

U.S. PATENT DOCUMENTS

| | | | |
|---|---|---|---|
| 7,639,321 B2 * | 12/2009 | Kwon et al. | 349/106 |
| 7,709,163 B2 * | 5/2010 | Ishigaki et al. | 430/7 |
| 2006/0274231 A1 * | 12/2006 | Kwon et al. | 349/106 |
| 2008/0088788 A1 * | 4/2008 | Cho et al. | 349/160 |
| 2008/0198308 A1 * | 8/2008 | Lee et al. | 349/106 |

* cited by examiner

*Primary Examiner* — Akm Ullah
(74) *Attorney, Agent, or Firm* — Winston Hsu; Scott Margo

(57) ABSTRACT

A liquid crystal display substrate includes a first active area and a second active area on the liquid crystal display substrate, a first black matrix and a second black matrix respectively surrounding the first active area and the second active area, a cutting region encircling the first black matrix and the second black matrix, and at least a guarding wall disposed on the black matrix or on the cutting region.

22 Claims, 10 Drawing Sheets

LIQUID CRYSTAL DISPLAY AND METHOD FOR FORMING ALIGNMENT FILM

BACKGROUND OF THE INVENTION

1. Field of the Invention

The present invention relates to a liquid crystal display device and a method for forming an alignment film. In particular, the present invention relates to a liquid crystal display device with at least a guarding wall to go with the formation of the alignment film.

2. Description of the Prior Art

The alignment film is considered as one of the crucial components in the liquid crystal display device. The alignment film is placed on the substrate of the liquid crystal display device, in order to construct the pretilt angle of the liquid crystal molecules, which is the kernel component of the liquid crystal device. Only when the liquid crystal molecules in the liquid crystal display panel have correct pretilt angle will the liquid crystal molecules twist correctly in accordance the external electric field to create the required images.

The process to form the alignment film requires rollers with specially designed patterns to correctly transfer the alignment film solution (the Pi solution) onto a pre-determined location of the panel on the substrate. FIG. 1 illustrates rollers with specially designed patterns to print the alignment film solution in the prior art. As shown in FIG. 1, the roller 110 has patterns 113 corresponding to a location of the panel on the substrate, so the alignment film solution 111 is transferred onto the substrate 114 by contacting the correct location on the substrate 114 to avoid any undesirable transfer of the alignment film solution 111 onto incorrect zones on the substrate 114, for example, the frame adhesive zone 115 because the alignment film solution 111 may compromise the function of the frame adhesive and jeopardize the quality of the liquid crystal display products.

However, liquid crystal display panels of various forms and of different sizes all require exclusive rollers of particular patterns in order to correspond to the unique patterns of the liquid crystal display process panels on the substrate. In particular, reserved spaces are needed for the frame adhesive and the external connectors on the liquid crystal display panels, so liquid crystal display panels of different specifications require exclusive rollers of particular patterns. Besides, with the larger and larger sizes of the liquid crystal display panels, for example those above G6 generation, it is harder and harder to make the corresponding unique patterned rollers. Solutions such as piecing up, in which smaller pieces are jointed together to obtain a larger, complete one, have been proposed. However, it adversely affects the production of the liquid crystal display panels. This process is neither economical nor cost-saving.

Accordingly, a novel substrate for the liquid crystal display process is needed to use non-exclusive rollers for various sizes and specifications. The alignment film solution can be correctly transferred onto a pre-determined location of the panel on the substrate by a simplest and easiest method without interfering with other regions on the substrate.

SUMMARY OF THE INVENTION

The present invention therefore proposes a liquid crystal display device with a guarding wall and a method to form an alignment film. The advantages of the liquid crystal display device reside in that non-exclusive rollers for various sizes and specifications are used to correctly transfer the alignment film solution onto a pre-determined location of the panel on the substrate by a simplest and easiest method without interfering with other regions, such as the frame adhesive zone, on the substrate. The method of the present invention is time-saving, economical, cost-saving and quality-maintaining.

The present invention first proposes a liquid crystal display process panel. The liquid crystal display process panel of the present invention includes a substrate, a first active area and a second active area respectively disposed on the substrate, a first black matrix and a second black matrix respectively surrounding the first active area and the second active area, a cutting region encircling the first black matrix and the second black matrix, a first frame adhesive zone on the cutting region and adjacent to the first black matrix, a second frame adhesive zone on the cutting region and adjacent to the second black matrix and a first guarding wall and a second guarding wall respectively disposed on the first black matrix and on the second black matrix. Preferably, the substrate may be a color filter substrate, a color filter on array (COA) or a thin film transistor substrate.

The present invention proposes another liquid crystal display process panel. The liquid crystal display process panel of the present invention includes a substrate, a first active area and a second active area respectively disposed on the substrate, a first black matrix and a second black matrix respectively surrounding the first active area and the second active area, a cutting region encircling the first black matrix and the second black matrix, a first frame adhesive zone on the cutting region and adjacent to the first black matrix, a second frame adhesive zone on the cutting region and adjacent to the second black matrix and a first guarding wall disposed on the cutting region and between the first adhesive zone and the second adhesive zone so that the first guarding wall keeps a pre-determined distance from both the first black matrix and the second black matrix. Preferably, the substrate may be a color filter substrate, a color filter on array (COA) or a thin film transistor substrate.

The present invention further proposes a liquid crystal display process panel. The liquid crystal display process panel of the present invention includes a substrate, a first active area and a second active area respectively disposed on the substrate, a first black matrix and a second black matrix respectively surrounding the first active area and the second active area, a cutting region encircling the first black matrix and the second black matrix, a first frame adhesive zone on the cutting region and adjacent to the first black matrix, a second frame adhesive zone on the cutting region and adjacent to the second black matrix and a first guarding wall and a second guarding wall disposed on the cutting region so that a distance between the first guarding wall and the first black matrix is smaller than a pre-determined value and a distance between the second guarding wall and the second black matrix is smaller than the pre-determined value. Preferably, the substrate may be a color filter substrate, a color filter on array (COA) or a thin film transistor substrate.

The present invention again proposes a method to form an alignment film. First, a roller with no substantial pattern for printing an alignment film solution is provided. Second, a liquid crystal display process panel is provided. The liquid crystal display process panel includes a substrate, a first active area and a second active area, a first black matrix and a second black matrix respectively surrounding the first active area and the second active area. Later, the alignment film solution is transferred from the roller onto the first active area and onto the second active area to form the alignment film. The first black matrix and the second black matrix are so arranged that the alignment film solution on the roller substantially does not contact the first frame adhesive zone and the second frame adhesive zone. Preferably, the substrate may be a color filter substrate, a color filter on array (COA) or a thin film transistor substrate.

These and other objectives of the present invention will no doubt become obvious to those of ordinary skill in the art after reading the following detailed description of the preferred embodiment that is illustrated in the various figures and drawings.

DETAILED DESCRIPTION

The present invention provides a novel liquid crystal display device and a method to form an alignment film. In the novel liquid crystal display device of the present invention there is a liquid crystal display process panel with a guarding wall. Because of the presence of the guarding wall, a roller with no substantial patterns may be used to correctly transfer the alignment film solution onto a pre-determined location of the panel on the substrate by a simplest and easiest method. Because the roller with no substantial patterns is not specific, it is applicable on liquid crystal display panel of various sizes and specification. There is no more need to design patterned rollers for liquid crystal display panels of specific size and specification. The cost for designing the specific rollers and replacing different rollers is saved. In addition, other regions, such as the frame adhesive zone, on the substrate are not jeopardized to maintain a pre-determined high quality of the liquid crystal display panel products. Still, the method of the present invention is not only compatible with the current industrial process but also solves the problems of the current industrial process. The method of the present invention is advantageous.

Figure 1:
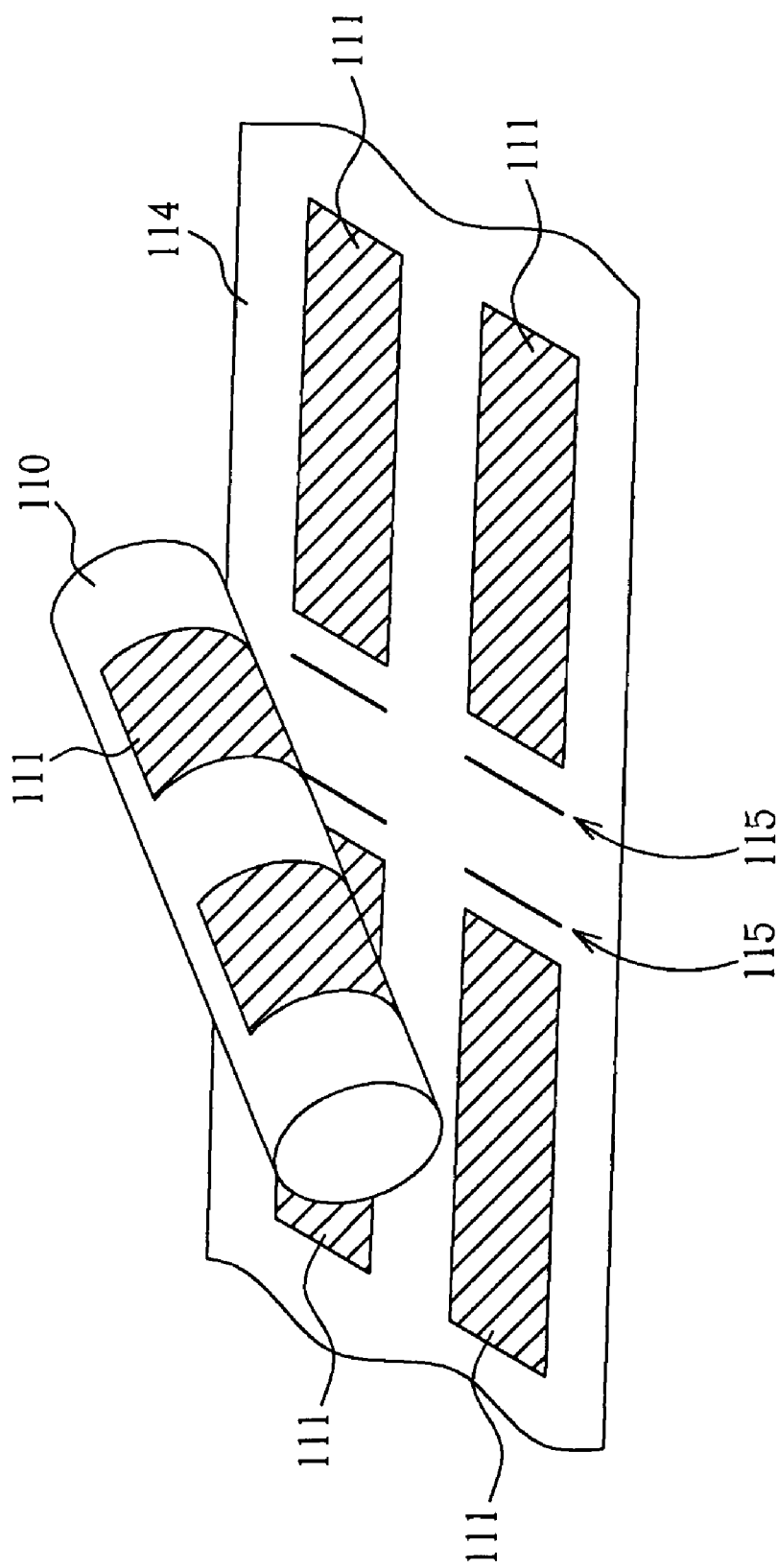
FIG. 1 illustrates rollers with specially designed patterns to print the alignment film solution in the prior art.
Figure 2:
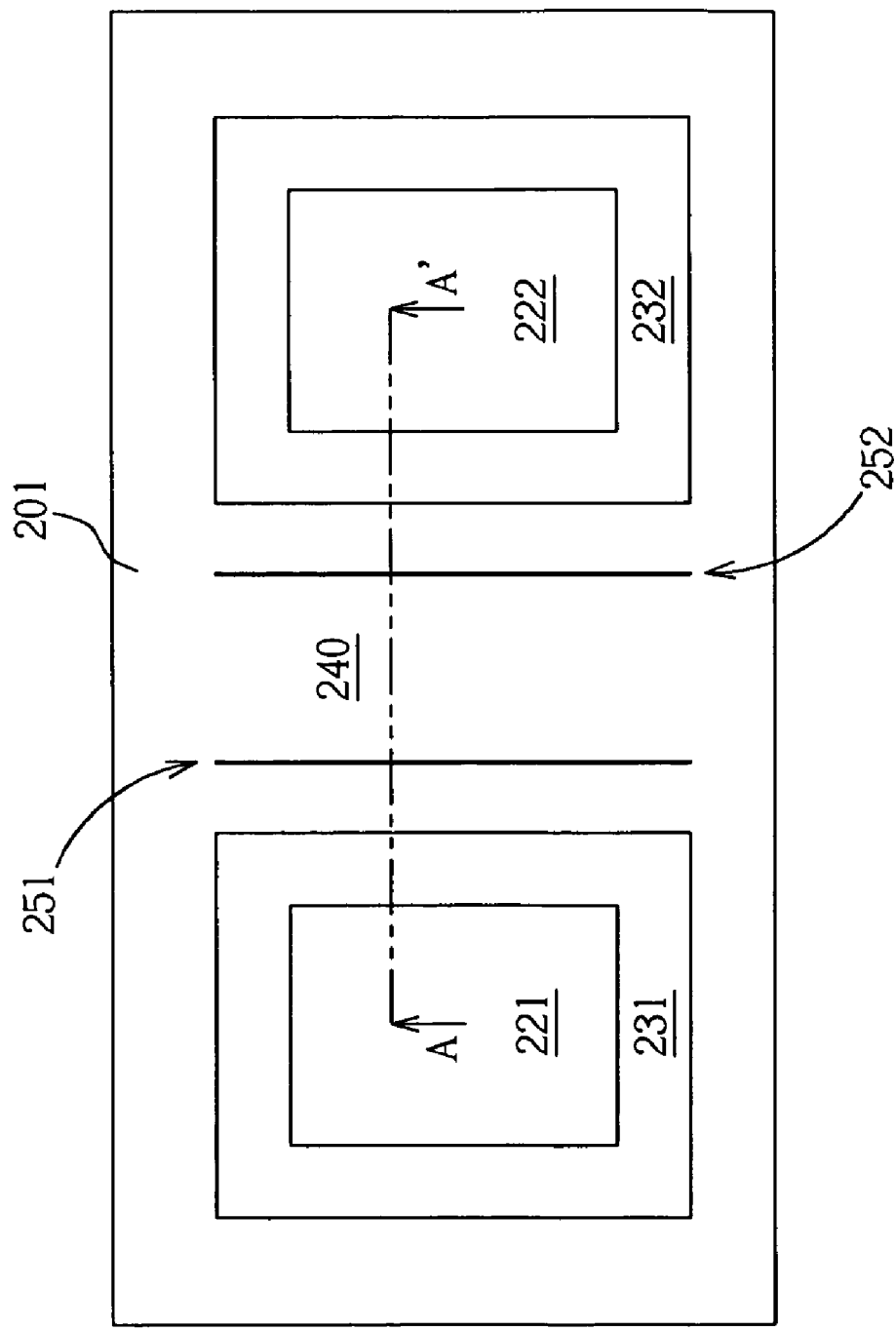
FIG. 2 illustrates a top view of a preferred embodiment of the liquid crystal display process panel of the present invention.

FIG. 2 illustrates a top view of a preferred embodiment of the liquid crystal display process panel of the present invention. Please refer to FIG. 2, in a first example of the liquid crystal display process panel of the present invention, the liquid crystal display process panel 201 includes multiple regions and zones to form the pre-determined liquid crystal display panel, such as a first active area 221 and a second active area 222, segregated by a cutting region 240. The regions and zones to form the pre-determined liquid crystal display panel further includes a first black matrix 231 and a first frame adhesive zone 251, and a second black matrix 232 and a second frame adhesive zone 252, relatively disposed on the outer part of the first active area 221 and the second active area 222. Each active area may be used for producing liquid crystal display panels of the same size and specification, but it is not limited. Each active area may be also used for producing liquid crystal display panels of different sizes and specifications. Besides, in one preferred embodiment of the present invention, the liquid crystal display process panel 201 may be a glass substrate such as a color filter substrate, a color filter on array (COA) or a thin film transistor substrate. If the liquid crystal display process panel 201 is a color filter substrate or a color filter on array (COA), at least a color filter, such as a red color filter, a green color filter or a blue color filter is formed in each active area in the liquid crystal display process panel 201. Or, if the liquid crystal display process panel 201 is a thin film transistor substrate, thin film transistors (not shown) to control the liquid crystal molecules are formed in each active area of the liquid crystal display process panel 201.

The first active area 221 and the second active area 222 are respectively located on the liquid crystal display process panel 201. No matter if the liquid crystal display process panel 201 is a color filter substrate, a color filter on array (COA) or a thin film transistor substrate, the color filter or the thin film transistor is respectively located in the first active area 221 and the second active area 222, and further surrounded by the first black matrix 231 and the second black matrix 232. If the liquid crystal display process panel 201 is a color filter on array (COA) or a thin film transistor substrate, material layers such as a metal layer (not shown), a dielectric layer (not shown), a silicon layer (not shown) or a passivation layer (not shown) are formed on each active area in advance.

The first black matrix 231 and the second black matrix 232 surrounding the first active area 221 and the second active area 222 not only are employed to define the first active area 221 and the second active area 222, but also to avoid the leakage of the illumination of the backlight module (not shown) and enhance the contrast. Usually, metal oxides or nitrides are used to form the first black matrix 231 and the second black matrix 232.

The region surrounding the first active area 221, the second active area 222, the first black matrix 231 and the second black matrix 232 is the cutting region 240. In addition, the first frame adhesive zone 251 and the second frame adhesive zone 252 may also be located on the cutting region 240. After the liquid crystal display process panel 201 is completed, the cutting region 240 is used to cut the panel into products. The first frame adhesive zone 251 is adjacent to the first black matrix 231 and similarly, the second frame adhesive zone 252 is adjacent to the second black matrix 232, too. They are used to glue the frame, for example the color filter substrate, the color filter on array (COA) and the thin film transistor substrate. Usually, the first frame adhesive zone 251 and the second frame adhesive zone 252 are arranged to be parallel with the first black matrix 231 and the second black matrix 232.

EXAMPLE 1

Figure 3:
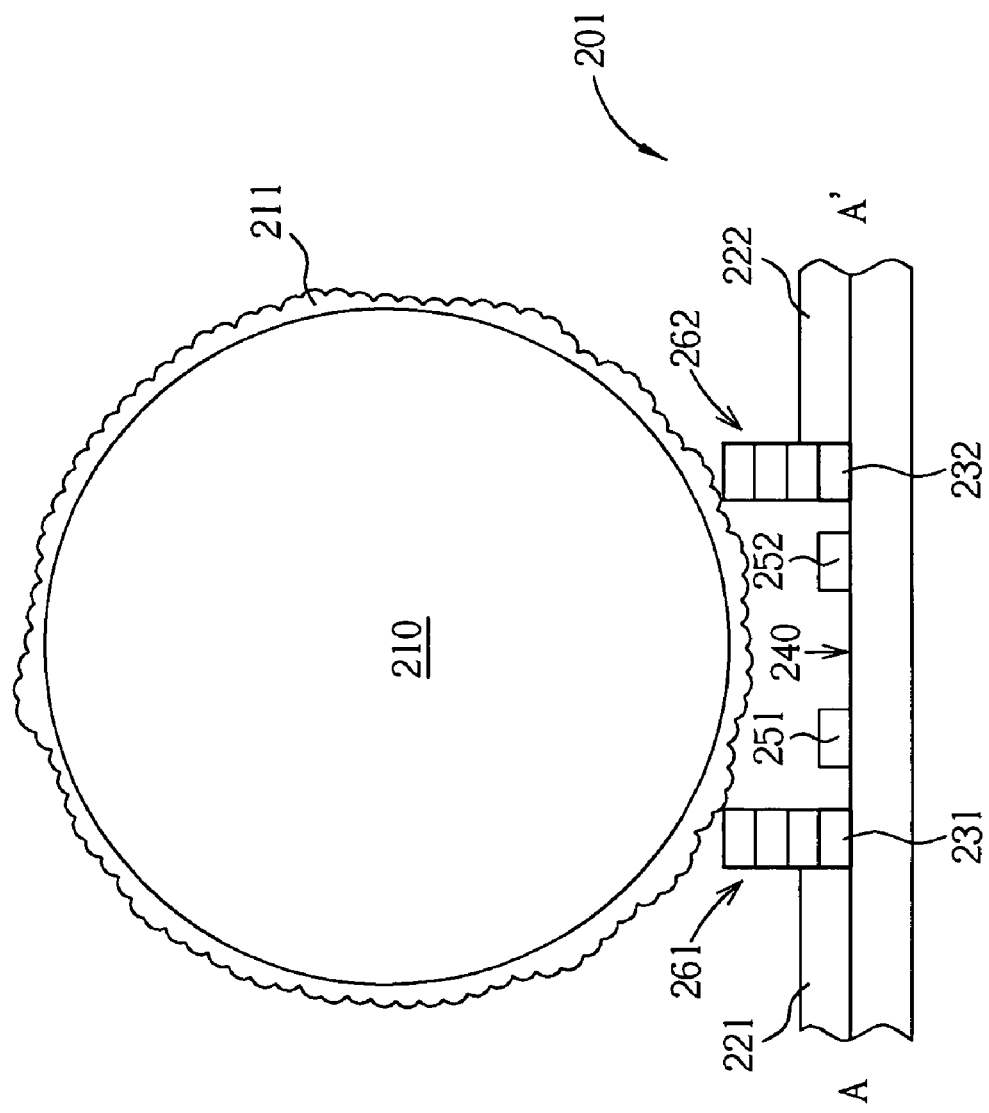
FIGS. 3-5 illustrate a liquid crystal display process panel of the present invention

The present invention first provides a liquid crystal display process panel. FIG. 3 illustrates a liquid crystal display process panel of the present invention, which is an embodiment of a cross-section of line A-A' of FIG. 2. As shown in FIG. 3, if a patternless planar roller 210 is used for overall transferring an alignment film solution 211 onto a liquid crystal display process panel 201, the first frame adhesive zone 251 and the second frame adhesive zone 252 may fail to glue the frame (not shown) well in a later step due to the adherence of the alignment film solution 211. In order to solve the problem, on the liquid crystal display process panel 201 of the present invention there are respectively a specially-designed first guarding wall 261 and a second guarding wall 262 to keep the alignment film solution 211 from contaminating the first frame adhesive zone 251 and the second frame adhesive zone 252.

The first guarding wall 261 is located on the first black matrix 231 and similarly, the second guarding wall 262 is located on the second black matrix 232, as shown in FIG. 3. With the help of the first guarding wall 261 and a second guarding wall 262, when a patternless planar roller 210 is used for overall transferring the alignment film solution 211 onto a liquid crystal display process panel 201, the alignment film solution 211 is kept from directly contacting the first frame adhesive zone 251 and from the second frame adhesive zone 252 in the presence of the blockage of the first guarding wall 261 and of the second guarding wall 262 so the alignment film solution 211 is therefore not able to contaminate the first frame adhesive zone 251 and the second frame adhesive zone 252 and the first frame adhesive zone 251 and the second frame adhesive zone 252 will not fail to glue the frame (not shown) well in a later step and the quality of the products of the liquid crystal display process panel 201 therefore is maintained.

The first guarding wall 261 and the second guarding wall 262 may respectively and independently include a concrete material. Take the liquid crystal display process panel 201 to be a color filter substrate or a color filter on array (COA) for example, considering the making of the first guarding wall 261 and the second guarding wall 262 to be compatible with the current industrial process, the first guarding wall 261 and the second guarding wall 262 may respectively and independently include at least a color filter layer, such as at least a red color filter, a green color filter and a blue color filter, so that the first guarding wall 261 and the second guarding wall 262 are high enough. Or, if the liquid crystal display process panel 201 is a thin film transistor substrate, the photo etching process (PEP) on the material layers such as a metal layer (not shown), a dielectric layer (not shown), a silicon layer (not shown) or a passivation layer (not shown) on each active area may also be used to construct the first guarding wall 261 and the second guarding wall 262 of enough height. Accordingly, if the first black matrix 231 and the second black matrix 232 are close enough, the first guarding wall 261 and the second guarding wall 262 are useful in keeping the alignment film solution 211 from directly contacting and contaminating the first frame adhesive zone 251 and the second frame adhesive zone 252.

However, if the first black matrix 231 and the second black matrix 232 are not close enough so that the first guarding wall 261 and the second guarding wall 262 on the first black matrix 231 and on the second black matrix 232 are not able to keep the alignment film solution 211 from directly contacting and contaminating the first frame adhesive zone 251 and the second frame adhesive zone 252, the first guarding wall 261 and the second guarding wall 262 can be otherwise arranged to accomplish the same result.

EXAMPLE 2

Figure 4:
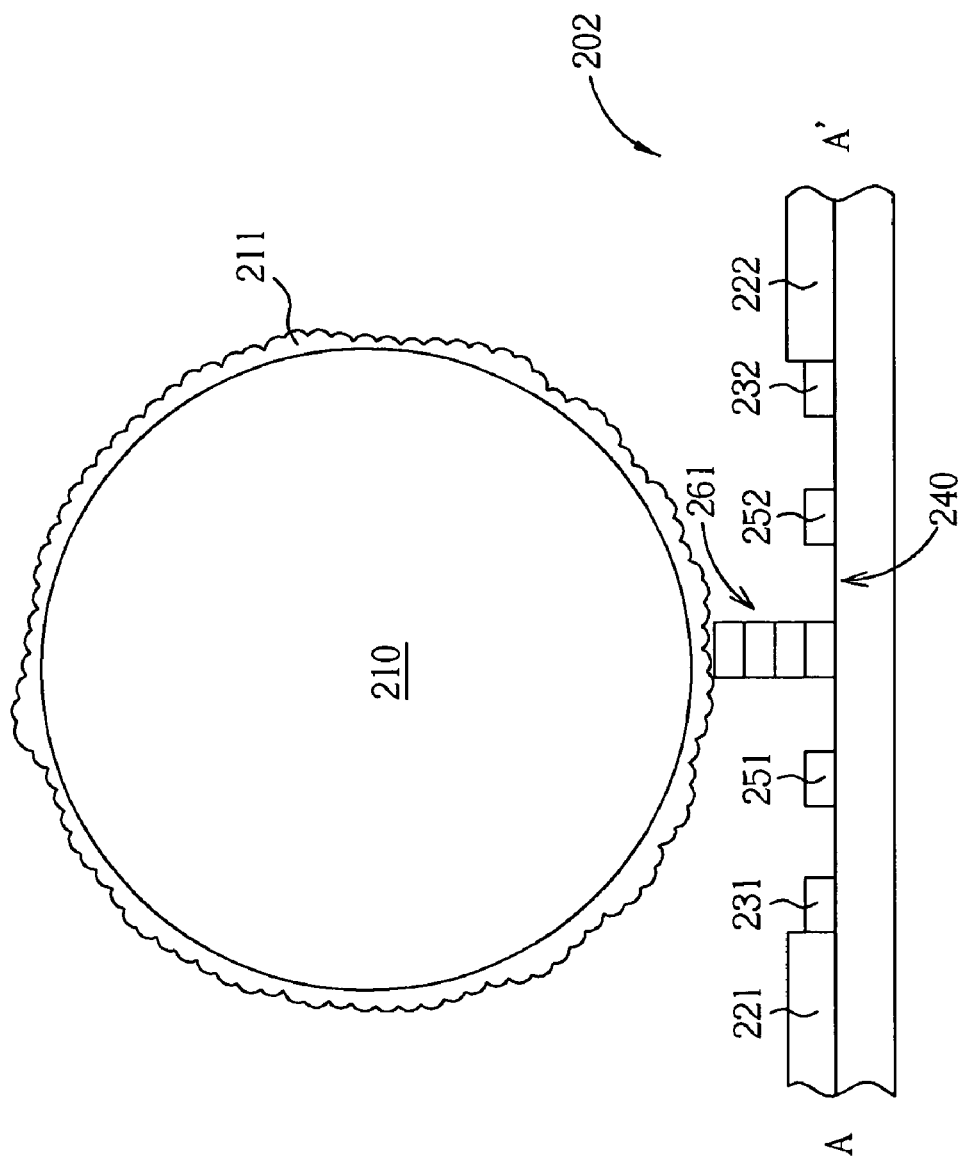

The present invention provides another liquid crystal display process panel. FIG. 4 illustrates another liquid crystal display process panel of the present invention, which is a cross-section of line A-A' of FIG. 2. As shown in FIG. 4, the liquid crystal display process panel 202 in EXAMPLE 2 includes a first active area 221, a second active area 222, a first black matrix 231, a second black matrix 232, a cutting region 240, a first frame adhesive zone 251 and a second frame adhesive zone 252. The liquid crystal display process panel 202, the first active area 221, the second active area 222, the first black matrix 231, the second black matrix 232, the cutting region 240, the first frame adhesive zone 251 and the second frame adhesive zone 252 in EXAMPLE 2 are generally similar to those illustrated in EXAMPLE 1. They may be used for producing liquid crystal display panels of the same size and specification or liquid crystal display panels of different sizes and specifications. The details will not be discussed here.

If the first black matrix 231 and the second black matrix 232 are not close enough so that the first guarding wall 261 on the first black matrix 231 and the second guarding wall 262 on the second black matrix 232 are not able to keep the alignment film solution 211 from directly contacting and contaminating the first frame adhesive zone 251 and the second frame adhesive zone 252, the liquid crystal display process panel 202 has the first guarding wall 261 located on the cutting region 240 and between the first frame adhesive zone 251 and the second frame adhesive zone 252 so that the first guarding wall 261 keeps a pre-determined distance from both the first black matrix 231 and the second black matrix 232. The pre-determined distance is optional in order to keep the alignment film solution 211 on the patternless planar roller 210 far away enough from the cutting region 240 in the presence of the support and blockage of the first guarding wall 261, as shown in FIG. 4, from directly contacting and contaminating the first frame adhesive zone 251 and the second frame adhesive zone 252 and from jeopardizing the quality of the products of the liquid crystal display device and also to keep the first frame adhesive zone 251 and the second frame adhesive zone 252 from failing when the patternless planar roller 210 overall transfers the alignment film solution 211 onto the liquid crystal display process panel 202.

The first guarding wall 261 may include a concrete material. Take the liquid crystal display process panel 201 to be a color filter substrate or a color filter on array (COA) for example, considering the making of the first guarding wall 261 to be compatible with the current industrial process, the first guarding wall 261 may include the material for the black matrix and/or at least a color filter layer, such as at least one of a red color filter, a green color filter and a blue color filter, so that the first guarding wall 261 is high enough. Or, if the liquid crystal display process panel 201 is a thin film transistor substrate, the photo etching process (PEP) on the material layers such as a metal layer (not shown), a dielectric layer (not shown), a silicon layer (not shown) or a passivation layer (not shown) on each active area may also be used to construct the first guarding wall 261 of enough height. Accordingly, the first black matrix 231 is high enough to block the alignment film solution 211 and to keep the alignment film solution 211 from directly contacting and contaminating the first frame adhesive zone 251 and the second frame adhesive zone 252.

However, if the first black matrix 231 and the second black matrix 232 are still not close enough so that the first guarding wall 261 on the cutting region 240 are not able to keep the alignment film solution 211 from directly contacting and contaminating the first frame adhesive zone 251 and the second frame adhesive zone 252, a second guarding wall 262 may be additionally introduced to accomplish the expected result.

EXAMPLE 3

Figure 5:
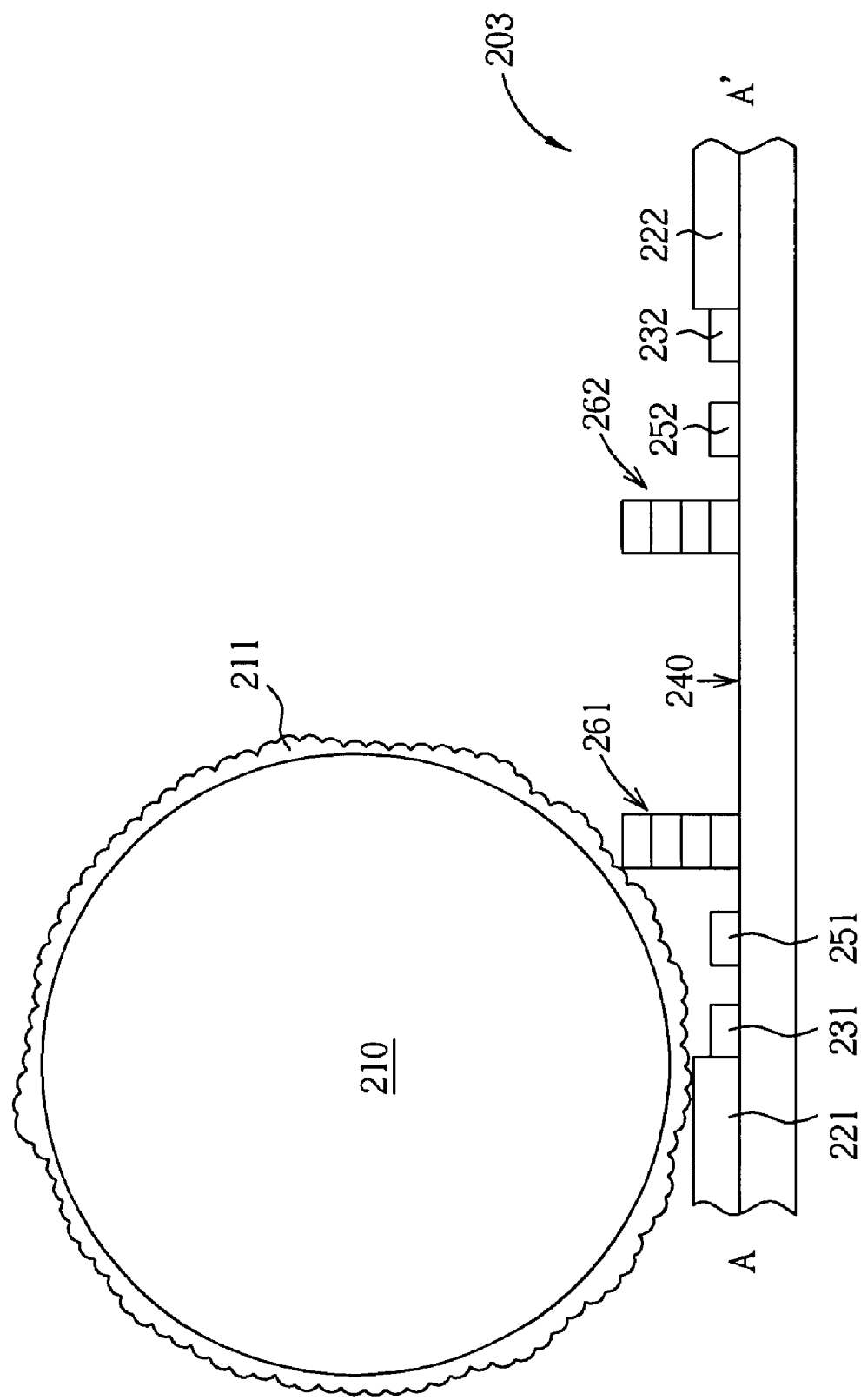

The present invention again provides another liquid crystal display process panel. FIG. 5 illustrates still another liquid crystal display process panel of the present invention, which is a cross-section of FIG. 2. As shown in FIG. 5, the liquid crystal display process panel 203 in EXAMPLE 3 includes a first active area 221, a second active area 222, a first black matrix 231, a second black matrix 232, a cutting region 240, a first frame adhesive zone 251 and a second frame adhesive zone 252. The liquid crystal display process panel 203, the first active area 221, the second active area 222, the first black matrix 231, the second black matrix 232, the cutting region 240, the first frame adhesive zone 251 and the second frame adhesive zone 252 in EXAMPLE 3 are generally similar to those described in EXAMPLE 1. They may be used for constructing liquid crystal display panels and the details will not be discussed here.

If the distance between the first black matrix 231 and the second black matrix 232 is too wide to make the first guarding wall 261 on the cutting region 240 not able to keep the alignment film solution 211 from directly contacting and contaminating the first frame adhesive zone 251 and the second frame adhesive zone 252, the liquid crystal display process panel 203 of the present invention further introduces a second guarding wall 262 to accomplish the expected result.

The first guarding wall 261 is located on the cutting region 240 and adjacent to the first black matrix 231 so that the distance between the first guarding wall 261 and the first black matrix 231 is smaller than a pre-determined value. The second guarding wall 262, like the first guarding wall 261, is also located on the cutting region 240 but adjacent to the second black matrix 232 so that the distance between the second guarding wall 262 and the second black matrix 232 is smaller than a pre-determined value. The pre-determined value is optional in order to keep the alignment film solution 211 on the patternless planar roller 210 far away enough from the cutting region 240, from directly contacting and contaminating the first frame adhesive zone 251 and the second frame adhesive zone 252 and from jeopardizing the quality of the products of the liquid crystal display device and also to keep the first frame adhesive zone 251 and the second frame adhesive zone 252 from failing because the first guarding wall 261 and the second guarding wall 262 are respectively so close to the first black matrix 231 and the second black matrix 232 that the first frame adhesive zone 251 and the second frame adhesive zone 252 are respectively sandwiched in between, as shown in FIG. 5, when the patternless planar roller 210 overall transfers the alignment film solution 211 onto the liquid crystal display process panel 203.

The first guarding wall 261 and the second guarding wall 262 may respectively and independently include a concrete material. As described earlier, considering the making of the first guarding wall 261 and the second guarding wall 262 to be compatible with the current industrial process, the first guarding wall 261 and the second guarding wall 262 may respectively and independently include the material for the black matrix and/or at least a color filter layer, such as at least one of a red color filter, a green color filter and a blue color filter, or integrated with the photo etching process (PEP) on the material layers such as a metal layer (not shown), a dielectric layer (not shown), a silicon layer (not shown) or a passivation layer (not shown), so that the first guarding wall 261 and the second guarding wall 262 are high enough. As a result, when the alignment film solution 211 on the planar roller 210 approaches the cutting region 240, the first guarding wall 261 and the second guarding wall 262 are high enough to block the alignment film solution 211 and to keep the alignment film solution 211 from the first frame adhesive zone 251 and the second frame adhesive zone 252.

Figure 6:
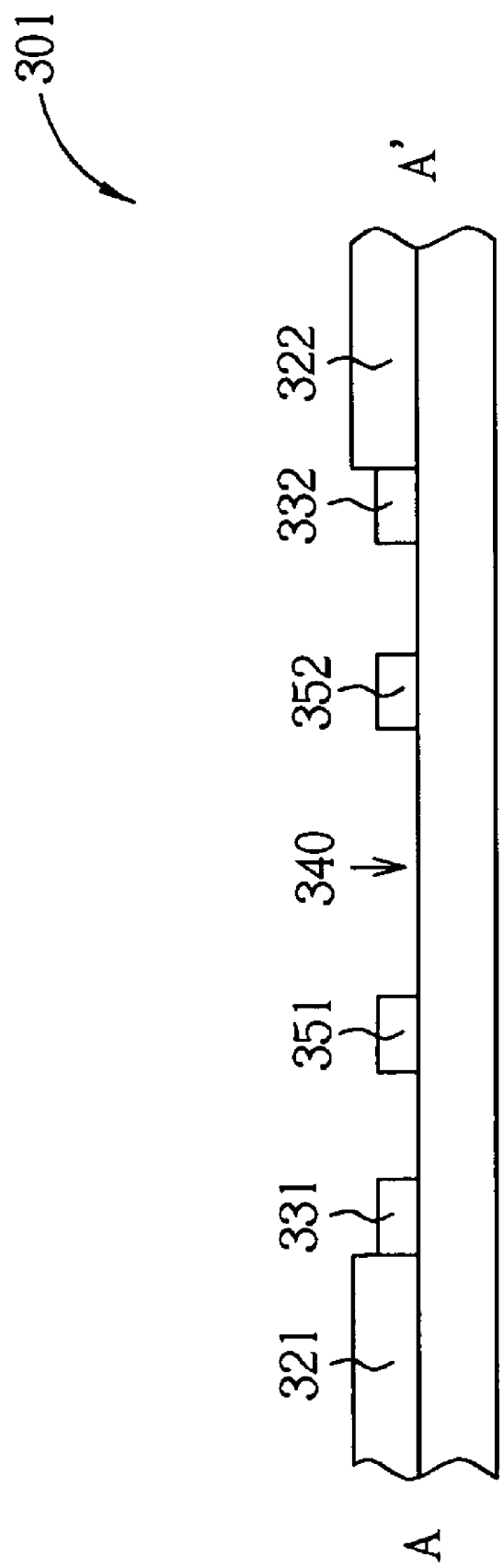
FIGS. 6-10 illustrate a preferred example of a method to form an alignment film of the present invention.

In another aspect, the present invention provides a method to form an alignment film. FIGS. 6-10 illustrate a preferred example of a method to form an alignment film of the present invention. First, as shown in FIG. 6, a liquid crystal display process panel 301 is provided. The liquid crystal display process panel 301 may be a color filter substrate, a color filter on array (COA) or a glass substrate coated with a transparent conductive material. If the liquid crystal display process panel 301 is a color filter substrate or a color filter on array (COA), at least one of a red color filter, a green color filter or a blue color filter is formed in each active area on the liquid crystal display process panel 301. Alternatively, if the liquid crystal display process panel 301 is a thin film transistor substrate, thin film transistors (not shown) for controlling the liquid crystal are formed in each active area on the liquid crystal display process panel 301. The liquid crystal display process panel 301 includes a first active area 321, a second active area 322, a first black matrix 331 and a second black matrix 332, a cutting region 340, a first frame adhesive zone 351, a second frame adhesive zone 352. If the liquid crystal display process panel 301 is a thin film transistor substrate, material layers such as a metal layer (not shown), a dielectric layer (not shown), a silicon layer (not shown) or a passivation layer (not shown) are formed on each active area in advance.

The first black matrix 331 surrounds the first active area 321 and the second black matrix 332 surrounds the second active area 322. In addition, the cutting region 340 encircles the first black matrix 331 and the second black matrix 332. No matter if the liquid crystal display process panel 301 is a color filter substrate, a color filter on array (COA) or a thin film transistor substrate, the color filter or the thin film transistor is respectively located in the first active area 321 and in the second active area 322, and further surrounded by the first black matrix 331 and the second black matrix 332.

The first black matrix 331 and the second black matrix 332 surrounding the first active area 321 and the second active area 322 not only are employed to define the first active area 321 and the second active area 322, but also to avoid the leakage of the illumination of the backlight module (not shown) and enhance the contrast. Usually, metal oxides or nitrides are used to form the first black matrix 331 and the second black matrix 332.

The region surrounding the first active area 321, the second active area 322, the first black matrix 331 and the second black matrix 332 is the cutting region 340. In addition, the first frame adhesive zone 351 and the second frame adhesive zone 352 may also be located on the cutting region 340. After the liquid crystal display process panel 301 is completed, the cutting region 340 is used to cut the panel into products. The first frame adhesive zone 351 is adjacent to the first black matrix 331 and similarly, the second frame adhesive zone 352 is adjacent to the second black matrix 332. They are used to glue the frame. Usually, the first frame adhesive zone 351 and the second frame adhesive zone 352 are arranged to be parallel with the first black matrix 331 and the second black matrix 332.

Figure 7:
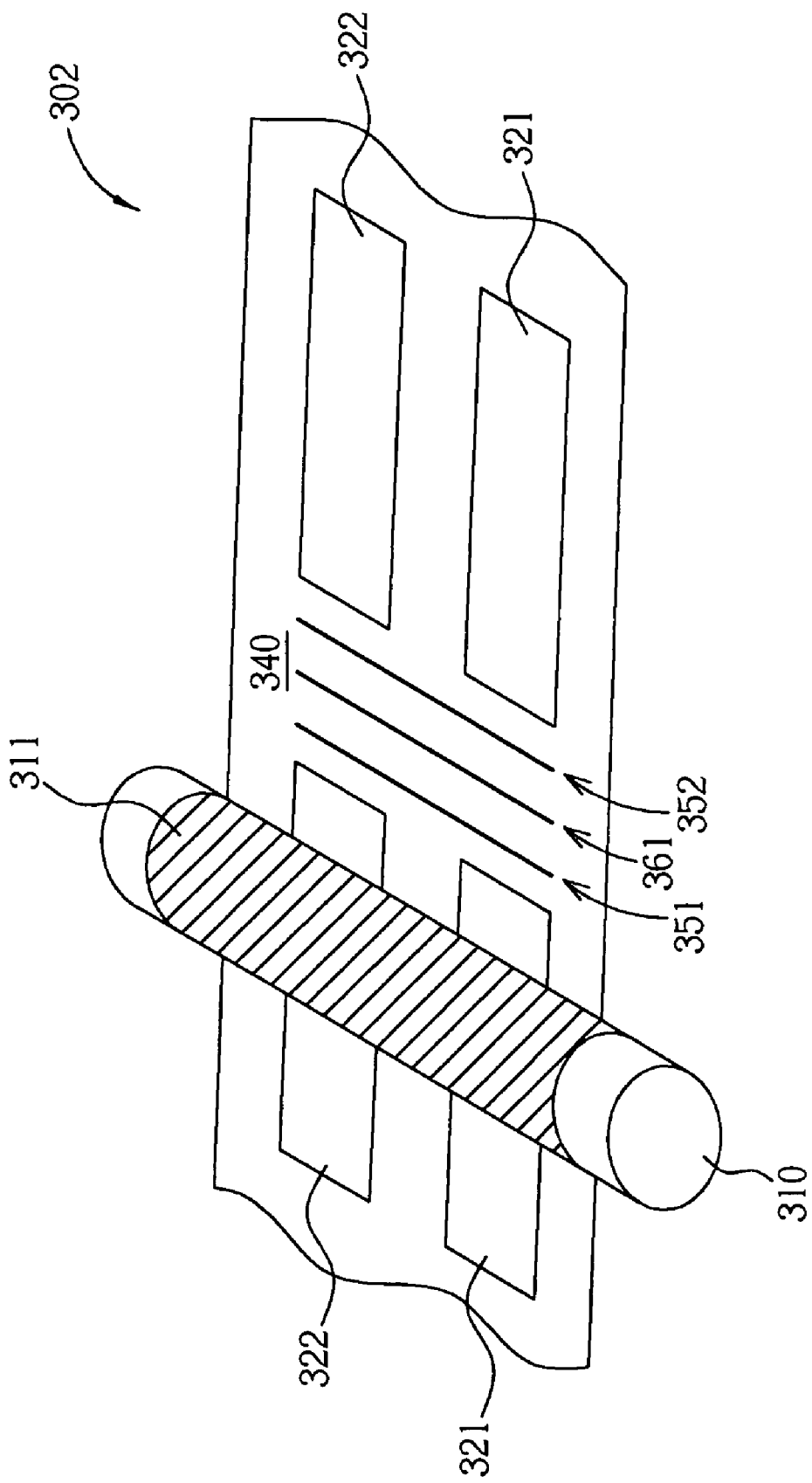

Second, as shown in FIG. 7, a roller 311 with no substantial pattern is provided. The alignment film solution 312 adheres to the roller 311 to be printed onto the first active area 321 and the second active area 322. The alignment film solution 312 usually includes an organic polymer compound and a diluent. The suitable organic polymer compound to formulate the alignment film solution 312 may be polyimide (PI).

Then the roller 311 is used to transfer the alignment film solution 312 onto the first active area 321 and the second active area 322 to form the alignment film 313. The first black matrix 331 and the second black matrix 332 are so arranged that the alignment film solution 312 on the roller 311 substantially is not able to contact the first frame adhesive zone 351 and the second frame adhesive zone 352. In order to keep the alignment film solution 312 on the roller 311 away from the first frame adhesive zone 351 and the second frame adhesive zone 352, the liquid crystal display process panel 301 may include at least one of a first guarding wall and a second guarding wall.

Figure 8:
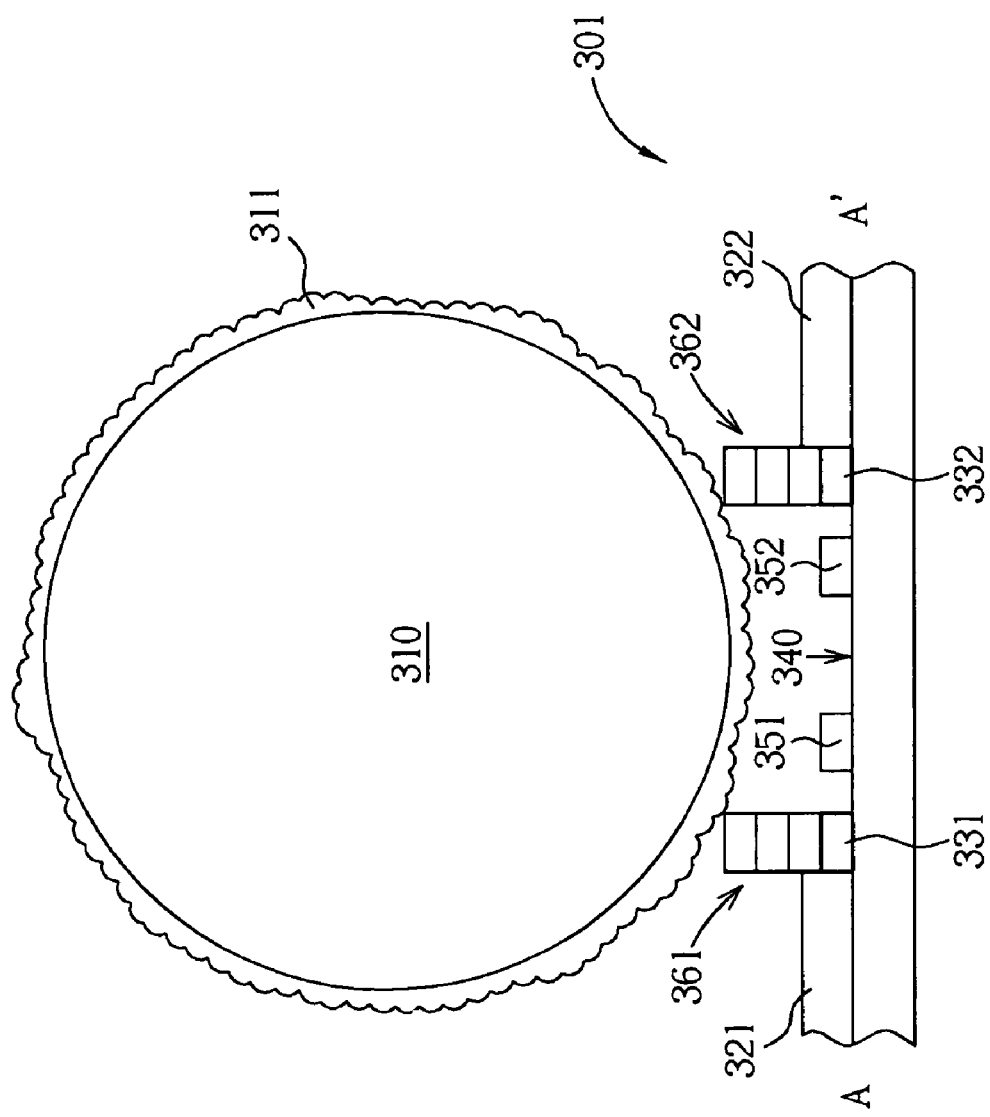

In a first embodiment of the present invention, as shown in FIG. 8, the first guarding wall 361 is disposed on the first black matrix 331 and/or the second guarding wall 362 is disposed on the second black matrix 332. Because the distance between the first guarding wall 361 and the second guarding wall 362 is smaller than a pre-determined value, the alignment film solution 312 on the roller 311 is kept away from the first frame adhesive zone 351 and the second frame adhesive zone 352.

Figure 9:
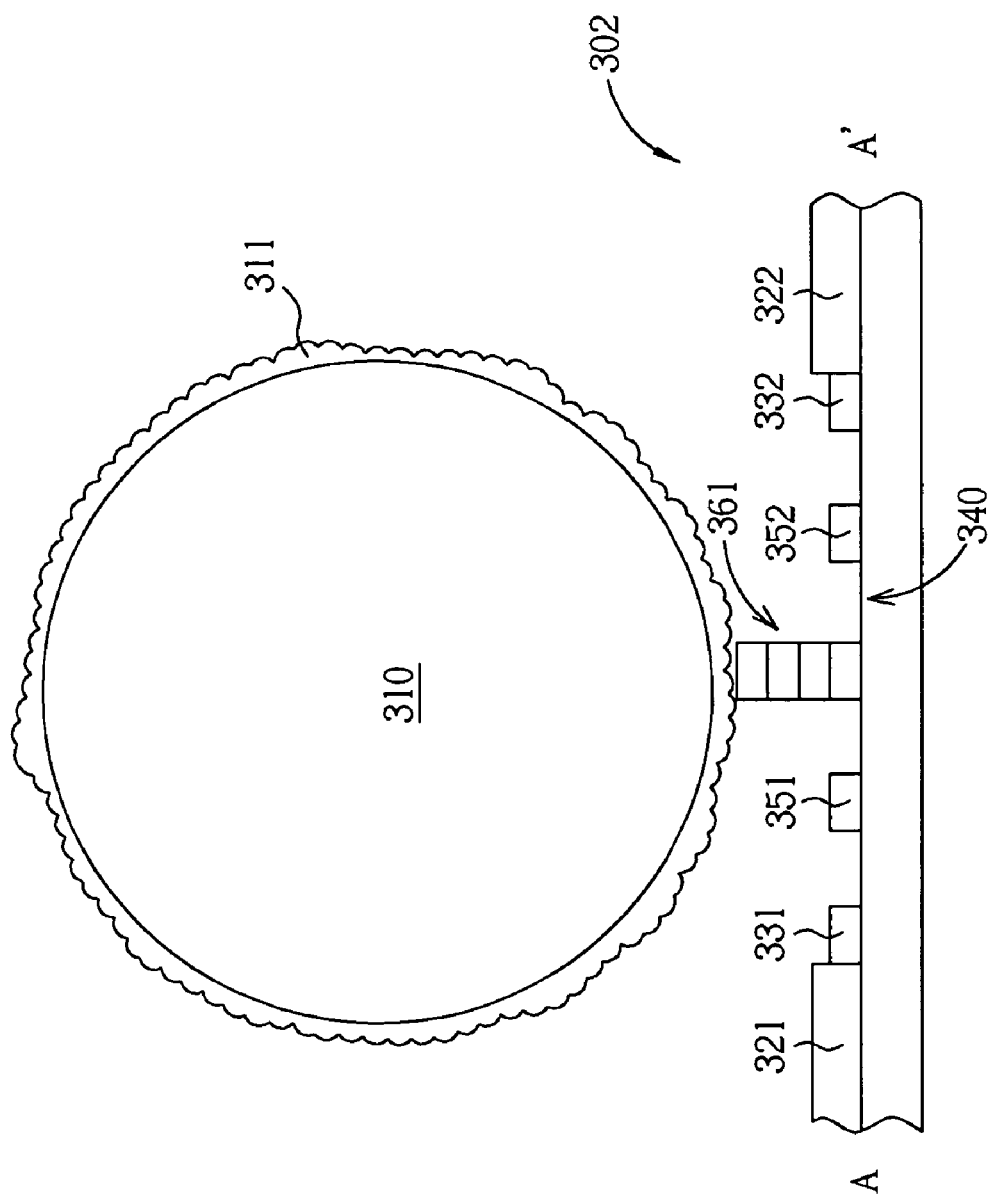

In a second embodiment of the present invention, as shown in FIG. 9, the first guarding wall 361 is disposed on the cutting region 340 and between the first frame adhesive zone 351 and the second frame adhesive zone 352. The first guarding wall 361 keeps a pre-determined distance from the first black matrix 331 and from the second black matrix 332 so that the alignment film solution 312 on the roller 311 is kept away from the first frame adhesive zone 351 and the second frame adhesive zone 352.

Figure 10:
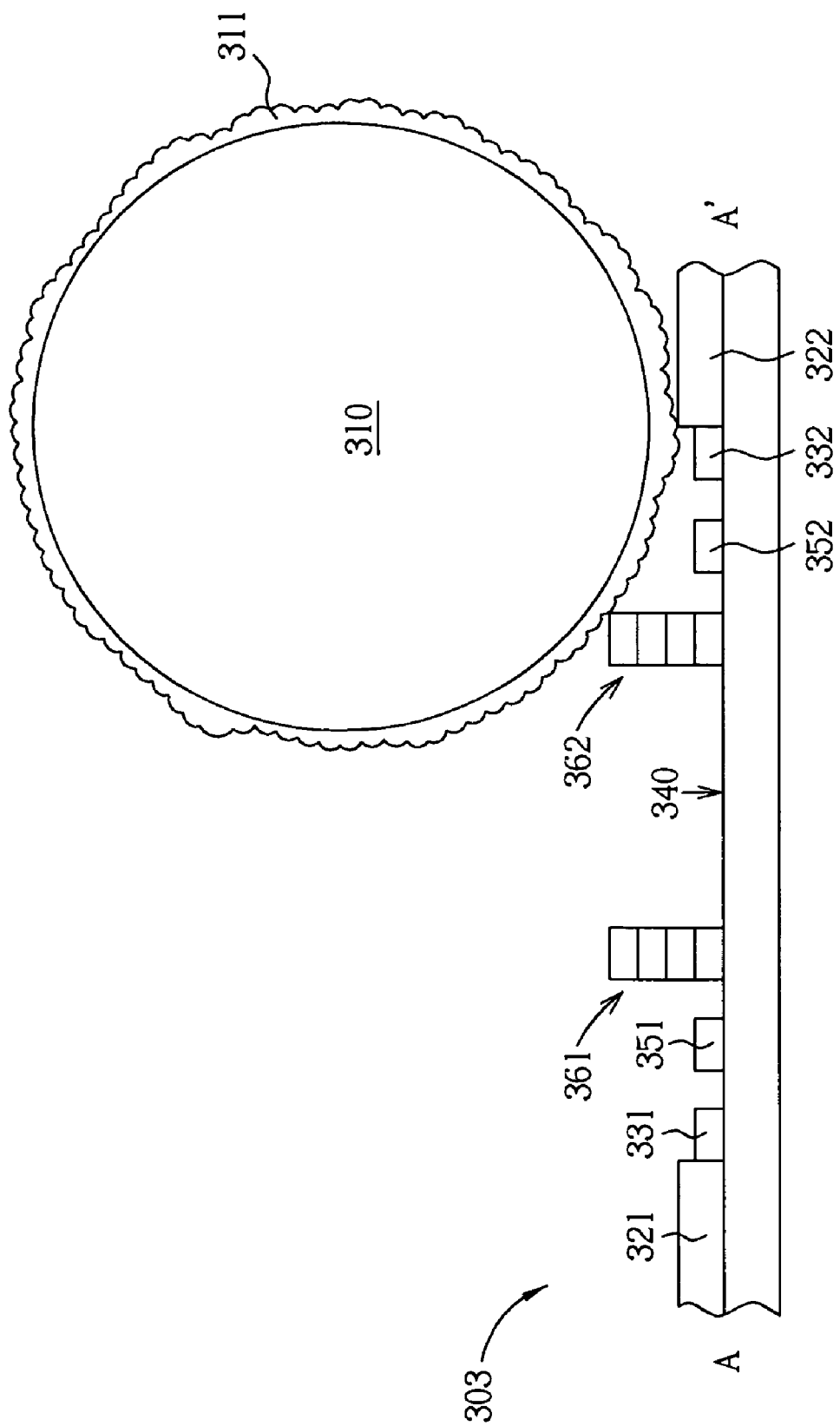

In a third embodiment of the present invention, as shown in FIG. 10, the first frame adhesive zone 351 is disposed between the first guarding wall 361 and the first black matrix 331. Similarly, the second frame adhesive zone 352 is disposed between the second guarding wall 362 and the second black matrix 332. Because the distance between the first guarding wall 361 and the first black matrix 331 is smaller than a pre-determined value and the distance between the second guarding wall 362 and the second black matrix 332 is smaller than a pre-determined value, the alignment film solution 312 on the roller 311 is kept away from the first frame adhesive zone 351 and the second frame adhesive zone 352.

In each above-described embodiment, the first guarding wall 361 and/or the second guarding wall 362 may respectively and independently include a concrete material. Considering the making of the first guarding wall 361 and the second guarding wall 362 to be compatible with the current industrial process, the first guarding wall 361 and the second guarding wall 362 may be respectively and independently include a material of the black matrix and/or at least a color filter layer, such as at least a red color filter, a green color filter and a blue color filter, or integrated with the photo etching process (PEP) performed on the material layers such as a metal layer (not shown), a dielectric layer (not shown), a silicon layer (not shown) or a passivation layer (not shown) on each active area so that the first guarding wall 361 and the second guarding wall 362 are high enough. As a consequence, when the alignment film solution 312 on the roller 311 approaches the cutting region 340, the first guarding wall 361 and the second guarding wall 362 are able to block the alignment film solution 312 and to keep the alignment film solution 312 away from the first frame adhesive zone 351 and the second frame adhesive zone 352.

In one preferred embodiment of the present invention, the guarding walls are so arranged that the roller 311 moves along the vertical direction of the guarding walls, as shown in FIG. 7 to ensure the guarding walls are able to keep the frame adhesive zones away from the alignment film solution 312.

Those skilled in the art will readily observe that numerous modifications and alterations of the device and method may be made while retaining the teachings of the invention.

What is claimed is:

1. A liquid crystal display process panel, comprising:
   a substrate;
   a first active area and a second active area respectively disposed on said substrate;
   a first black matrix surrounding said first active area;
   a second black matrix surrounding said second active area;
   a first guarding wall disposed on said first black matrix;
   a second guarding wall disposed on said second black matrix, wherein a distance between said first guarding wall and said second guarding wall is smaller than a pre-determined value;
   a cutting region encircling said first black matrix and said second black matrix;
   a first frame adhesive zone on said cutting region and adjacent to said first black matrix; and
   a second frame adhesive zone on said cutting region and adjacent to said second black matrix.

2. The liquid crystal display process panel of claim 1, wherein said first guarding wall comprises at least a color filter layer.

3. The liquid crystal display process panel of claim 2, wherein said color filter layer is selected from a group consisting of a red color filter, a green color filter and a blue color filter.

4. The liquid crystal display process panel of claim 1, wherein said second guarding wall comprises at least a color filter layer.

5. The liquid crystal display process panel of claim 4, wherein said color filter layer is selected from a group consisting of a red color filter, a green color filter and a blue color filter.

6. A liquid crystal display process panel, comprising:
   a substrate;
   a first active area and a second active area respectively disposed on said substrate;
   a first black matrix surrounding said first active area;
   a second black matrix surrounding said second active area;
   a cutting region encircling said first black matrix and said second black matrix;
   a first frame adhesive zone on said cutting region and adjacent to said first black matrix;
   a second frame adhesive zone on said cutting region and adjacent to said second black matrix; and
   a first guarding wall disposed on said cutting region and between said first frame adhesive zone and said second frame adhesive zone, wherein said first guarding wall keeps a pre-determined distance from said first black matrix and from said second black matrix.

7. The liquid crystal display process panel of claim 6, wherein said first guarding wall comprises at least one of a third guarding wall and a color filter layer.

8. The liquid crystal display process panel of claim 7, wherein said color filter layer is selected from a group consisting of a red color filter, a green color filter and a blue color filter.

9. A liquid crystal display process panel, comprising:
   a substrate;
   a first active area and a second active area respectively disposed on said substrate;
   a first black matrix surrounding said first active area;
   a second black matrix surrounding said second active area;
   a cutting region encircling said first black matrix and said second black matrix;
   a first guarding wall disposed on said cutting region and adjacent to said first black matrix, wherein a distance between said first guarding wall and said first black matrix is smaller than a pre-determined value;
   a second guarding wall disposed on said cutting region and adjacent to said second black matrix, wherein a distance between said second guarding wall and said second black matrix is smaller than said pre-determined value;
   a first frame adhesive zone on said cutting region and between said first guarding wall and said first black matrix; and a second frame adhesive zone on said cutting region and between said second guarding wall and said second black matrix.

10. The liquid crystal display process panel of claim 9, wherein said first guarding wall comprises at least one of a third black matrix and a first color filter layer.

11. The liquid crystal display process panel of claim 10, wherein said first color filter layer is selected from a group consisting of a red color filter, a green color filter and a blue color filter.

12. The liquid crystal display process panel of claim 9, wherein said second guarding wall comprises at least one of a forth black matrix and a second color filter layer.

13. The liquid crystal display process panel of claim 12, wherein said second color filter layer is selected from a group consisting of a red color filter, a green color filter and a blue color filter.

14. A method to form an alignment film, comprising:
providing a roller with no substantial pattern for printing an alignment film solution;
providing a liquid crystal display process panel comprising:
a substrate;
a first active area and a second active area respectively disposed on said substrate;
a first black matrix surrounding said first active area;
a second black matrix surrounding said second active area;
a cutting region encircling said first black matrix and said second black matrix;
a first frame adhesive zone on said cutting region and adjacent to said first black matrix; and
a second frame adhesive zone on said cutting region and adjacent to said second black matrix; and
transferring said alignment film solution on said roller onto said first active area and said second active area to form said alignment film, wherein said first black matrix and said second black matrix are so arranged that said alignment film solution on said roller substantially does not contact said first frame adhesive zone and said second frame adhesive zone.

15. The method of claim 14, wherein said panel further comprises at least one of a first guarding wall and a second guarding wall.

16. The method of claim 15, wherein said first guarding wall is disposed on said first black matrix and said second guarding wall is disposed on said second black matrix so that a distance between said first guarding wall and said second guarding wall is smaller than a pre-determined value.

17. The method of claim 15, wherein said first guarding wall is disposed on said cutting region and between said first frame adhesive zone and said second frame adhesive zone, wherein said first guarding wall keeps a pre-determined distance from said first black matrix and said second black matrix.

18. The method of claim 15, wherein said first frame adhesive zone is disposed between said first guarding wall and said first black matrix so that a distance between said first guarding wall and said first black matrix is smaller than a pre-determined value, and said second frame adhesive zone is disposed between said second guarding wall and said second black matrix so that a distance between said second guarding wall and said second black matrix is smaller than said pre-determined value.

19. The method of claim 15, wherein said first guarding wall comprises at least one of a third guarding wall and a first color filter layer.

20. The method of claim 19, wherein said first color filter layer is selected from a group consisting of a red color filter, a green color filter and a blue color filter.

21. The method of claim 15, wherein said second guarding wall comprises at least one of a forth black matrix and a second color filter layer.

22. The method of claim 21, wherein said second color filter layer is selected from a group consisting of a red color filter, a green color filter and a blue color filter.

\* \* \* \* \*